JAMES BRADY.
Improvement in Filters.

No. 126,926.

Patented May 21, 1872.

Witnesses:
A. Bennersendorf
Francis McArdle

Inventor:
J. Brady
PER
Attorneys.

UNITED STATES PATENT OFFICE.

JAMES BRADY, OF NEW YORK, N. Y.

IMPROVEMENT IN FILTERS.

Specification forming part of Letters Patent No. 126,926, dated May 21, 1872.

Specification describing a new and Improved Filter and Cooler, invented by JAMES BRADY, of New York city, in the county and State of New York.

My invention consists of a cooler and filter in which a vertical division of a cylindrical vessel is made to provide an ice-chamber alongside the water-chambers, and the latter is divided horizontally by two pans having filters in the bottom, one being of wire screens, and the other being of sponge; the said filters being elevated a little above the bottoms of the pans, so that the settlings upon the said bottoms will not flow into them.

Figure 1:
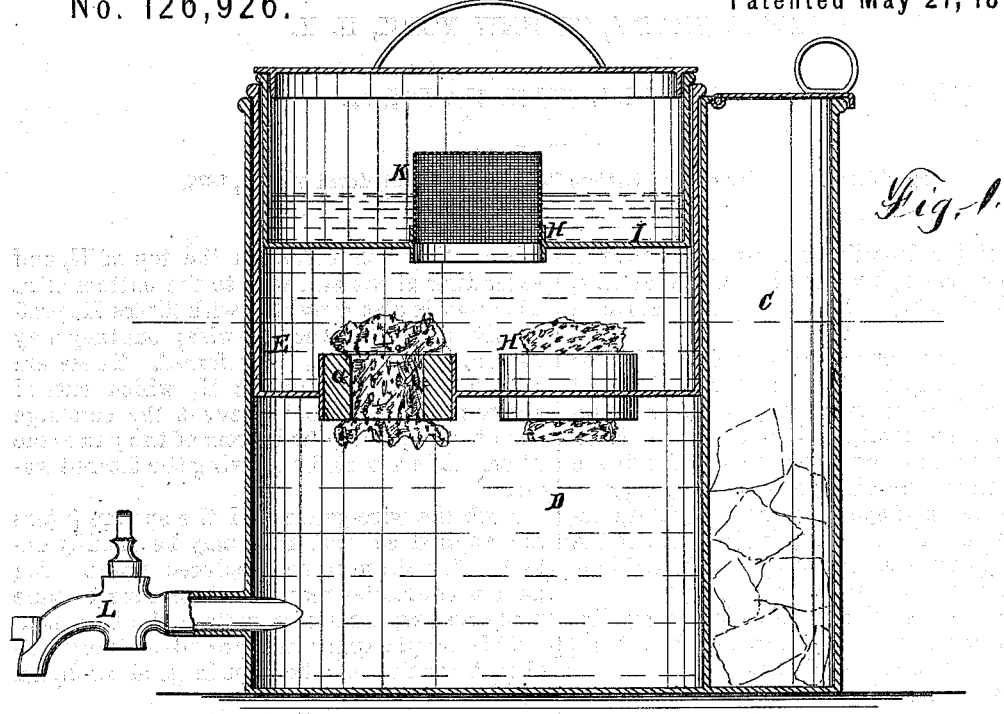
Figure 2:
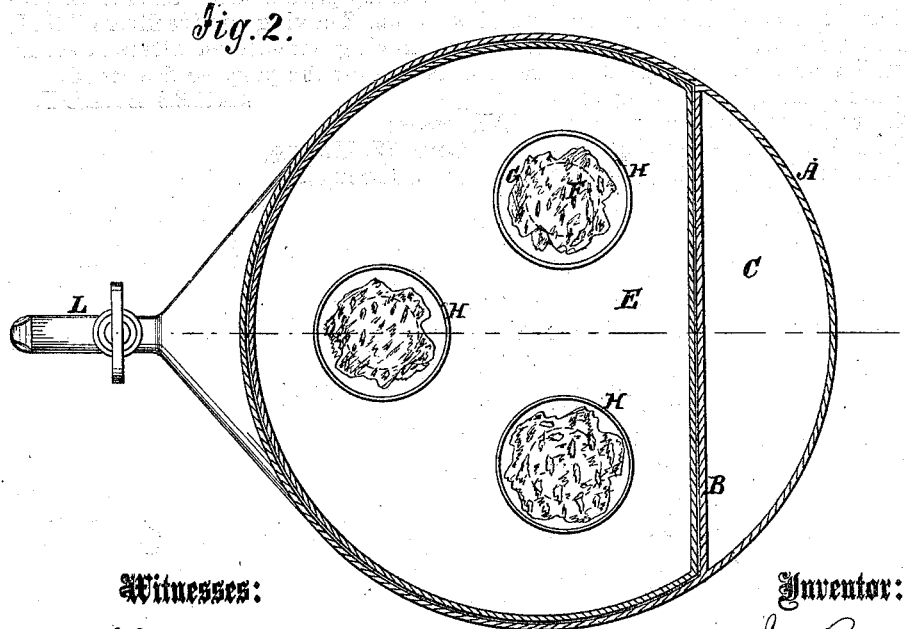

Figure 1 is a sectional elevation of my improved water filter and cooler, and Fig. 2 is a horizontal section of the same.

Similar letters of reference indicate corresponding parts.

A is a cylindrical vessel of sheet metal or other suitable substance open at the top, with a vertical partition, B, extending from top to bottom, and cutting off a small ice-chamber, C, from the main water-space D. In the latter is a pan, E, extending from the top down about half way to the bottom, and having one or more sponge filters in the bottom tightly packed in cork rings G, which are fitted snugly in the short cylinders H open at both ends. I is another pan fitting in the top of E, and extending about half way to the bottom of it. This pan is also provided with filters K, preferably made of fine screen-wire; but they may be made of sponge, if preferred. These are also fitted with cylinders H, which extend above the bottom and prevent the settlings from flowing along the bottom of the pan to the filter. L is a cock for drawing the filtered water.

Both the wire-gauze and the sponge filters are applied so that they may be readily detached for cleaning and replaced again. The pans may also be removed from time to time for removing the settlings from the bottoms.

This simple apparatus provides a very efficient filter that can be kept in good condition with very little care.

Having thus described my invention, I claim as new and desire to secure by Letters Patent—

The vertically-partitioned vessel A B, provided with pan E having sponge filters F G H, and pan I having wire-screen filters K H, arranged as and for the purpose described.

JAMES BRADY.

Witnesses:
GEO. W. MABEE,
T. B. MOSHER.